United States Patent
Mamiya et al.

(10) Patent No.: US 11,916,227 B2
(45) Date of Patent: Feb. 27, 2024

(54) MULTILAYER BODY AND METHOD FOR PRODUCING SAME

(71) Applicant: NATIONAL INSTITUTE OF ADVANCED INDUSTRIAL SCIENCE AND TECHNOLOGY, Tokyo (JP)

(72) Inventors: Mikito Mamiya, Tsukuba (JP); Junji Akimoto, Tsukuba (JP)

(73) Assignee: NATIONAL INSTITUTE OF ADVANCED INDUSTRIAL SCIENCE AND TECHNOLOGY (JP)

( * ) Notice: Subject to any disclaimer, the term of this patent is extended or adjusted under 35 U.S.C. 154(b) by 168 days.

(21) Appl. No.: 16/971,322

(22) PCT Filed: Feb. 22, 2019

(86) PCT No.: PCT/JP2019/006898
§ 371 (c)(1),
(2) Date: Aug. 20, 2020

(87) PCT Pub. No.: WO2019/163967
PCT Pub. Date: Aug. 29, 2019

(65) Prior Publication Data
US 2021/0013495 A1    Jan. 14, 2021

(30) Foreign Application Priority Data
Feb. 23, 2018 (JP) ................. 2018-031293

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0423* (2013.01); *H01M 4/0426* (2013.01);
(Continued)

(58) Field of Classification Search
CPC ............ H01M 4/36; H01M 4/48; H01M 4/04; H01M 4/1391; H01M 4/62
See application file for complete search history.

(56) References Cited

U.S. PATENT DOCUMENTS

| 2005/0048369 A1 | 3/2005 | Koshina et al. ........... 429/218.1 |
| 2005/0089757 A1 | 4/2005 | Bannai et al. ............. 429/231.8 |

(Continued)

FOREIGN PATENT DOCUMENTS

| CN | 102842707 A | 12/2012 |
| CN | 104466184 A | 3/2015 |

(Continued)

OTHER PUBLICATIONS

International Search Report dated Apr. 2, 2019 in corresponding PCT International Application No. PCT/JP2019/006898.

(Continued)

*Primary Examiner* — Kenneth J Douyette
(74) *Attorney, Agent, or Firm* — OSTROLENK FABER LLP

(57) ABSTRACT

A multilayer body is provided that is used as the negative electrode of a lithium-ion secondary battery that has a high capacity and is excellent in terms of safety, economic efficiency, and cycle characteristics. The multilayer body has a conductive substrate and a composite layer provided on the conductive substrate. The composite layer includes a plurality of particles of silicon oxide and a conductive substance present in gaps between the plurality of particles of silicon oxide. The average particle diameter of the particles of silicon oxide is 1.0 μm or less. The multilayer body further has a conductive layer that is provided on the composite layer and contains a conductive substance. The conductive layer has a thickness of 20 μm or less.

10 Claims, 15 Drawing Sheets

(51) Int. Cl.
  *H01M 4/13* (2010.01)
  *H01M 4/48* (2010.01)
  *H01M 10/0525* (2010.01)
  *H01M 4/131* (2010.01)
  *H01M 4/1391* (2010.01)
  *H01M 4/62* (2006.01)
  *H01G 11/26* (2013.01)
  *H01G 11/50* (2013.01)
  *H01M 4/02* (2006.01)

(52) U.S. Cl.
  CPC ......... *H01M 4/131* (2013.01); *H01M 4/1391* (2013.01); *H01M 4/483* (2013.01); *H01M 4/624* (2013.01); *H01M 10/0525* (2013.01); *H01G 11/26* (2013.01); *H01G 11/50* (2013.01); *H01M 2004/021* (2013.01); *H01M 2004/027* (2013.01)

(56) References Cited

U.S. PATENT DOCUMENTS

| | | | |
|---|---|---|---|
| 2006/0216604 A1 | 9/2006 | Kawase et al. | 429/231.95 |
| 2010/0129718 A1 | 5/2010 | Higuchi | |
| 2010/0255369 A1* | 10/2010 | Hwang | H01M 4/505 429/324 |
| 2010/0288970 A1* | 11/2010 | Watanabe | H01M 4/1395 216/13 |
| 2013/0089785 A1 | 4/2013 | Yasuda | |
| 2014/0154576 A1* | 6/2014 | Kang | H01M 4/623 429/231 |
| 2014/0203273 A1 | 7/2014 | Kubota | 257/40 |
| 2014/0255796 A1* | 9/2014 | Matsuoka | H01M 4/139 429/188 |
| 2016/0285101 A1 | 9/2016 | Yoshio et al. | |
| 2019/0006661 A1* | 1/2019 | Matsuno | H01M 4/366 |

FOREIGN PATENT DOCUMENTS

| | | | | |
|---|---|---|---|---|
| CN | 105580164 A | 5/2016 | | |
| CN | 107431186 A | 12/2017 | | |
| JP | 2001-185127 A | 7/2001 | | |
| JP | 2003-303618 A | 10/2003 | | |
| JP | 2004-047404 A | 2/2004 | | |
| JP | 2004-175094 A | 6/2004 | | |
| JP | 2005-100959 A | 4/2005 | | |
| JP | 2005-158721 A | 6/2005 | | |
| JP | 2007-005108 A | 1/2007 | | |
| JP | 2009-205981 A | 9/2009 | | |
| JP | 2010-177209 A | 8/2010 | | |
| JP | 2011-009228 A | 1/2011 | | |
| JP | 2013-134863 A | 7/2013 | | |
| JP | 2014-197499 A | 10/2014 | | |
| JP | 2014-529869 A | 11/2014 | | |
| JP | 2016-181487 A | 10/2016 | | |
| JP | 2017123281 A | * | 7/2017 | ............ C01B 32/05 |
| TW | I324411 B | 5/2010 | | |
| WO | WO 2005/057715 A1 | 6/2005 | | |
| WO | WO 2011/158459 A1 | 12/2011 | | |
| WO | WO 2013/032890 A1 | 3/2013 | | |
| WO | WO 2013/042745 A1 | 3/2013 | | |

OTHER PUBLICATIONS

Written Opinion dated Apr. 2, 2019 in corresponding PCT International Application No. PCT/JP2019/006898.

U.S. Vogl et al., "Mechanism of Interactions between CMC Binder and Si Single Crystal Facets," Langmuir, 2014, vol. 30, pp. 10299-10307.

M. Mamiya et al., "Preparation of fine silicon particles from amorphous silicon monoxide by the disproportionation reaction," Journal of Crystal Growth, 229 (2001), pp. 457-461.

* cited by examiner

EVALUATION OF CYCLE CHARACTERISTICS

| NUMBER OF CYCLES | CHARGING CAPACITY (mAh/g) | DISCHARGING CAPACITY (mAh/g) |
|---|---|---|
| 1 | 3696.1 | 2018.3 |
| 2 | 2288.5 | 2077.7 |
| 10 | 2108.3 | 2043.4 |
| 100 | 2144.2 | 2117.7 |
| 200 | 2097.0 | 2066.9 |

EVALUATION OF CYCLE CHARACTERISTICS

| NUMBER OF CYCLES | CHARGING CAPACITY (mAh/g) | DISCHARGING CAPACITY (mAh/g) |
|---|---|---|
| 1 | 3956.9 | 2006.7 |
| 2 | 2330.4 | 2108.5 |
| 10 | 2261.4 | 2166.8 |
| 50 | 1810.7 | 1782.7 |
| 100 | 1725.9 | 1688.7 |

EVALUATION OF CYCLE CHARACTERISTICS

| NUMBER OF CYCLES | CHARGING CAPACITY (mAh/g) | DISCHARGING CAPACITY (mAh/g) |
|---|---|---|
| 1 | 6383.6 | 3090.0 |
| 2 | 3419.9 | 2624.0 |
| 10 | 2643.5 | 2263.4 |
| 50 | 1427.1 | 1086.1 |
| 100 | 940.94 | 717.30 |

EVALUATION OF CYCLE CHARACTERISTICS

| NUMBER OF CYCLES | CHARGING CAPACITY (mAh/g) | DISCHARGING CAPACITY (mAh/g) |
|---|---|---|
| 1 | 4232.9 | 1880.2 |
| 2 | 2135.7 | 1856.2 |
| 10 | 1847.5 | 1776.3 |
| 100 | 1720.2 | 1704.5 |
| 200 | 1919.5 | 1900.2 |
| 300 | 1803.0 | 1812.6 |

EVALUATION OF CYCLE CHARACTERISTICS

| NUMBER OF CYCLES | CHARGING CAPACITY (mAh/g) | DISCHARGING CAPACITY (mAh/g) |
| --- | --- | --- |
| 1 | 2416.8 | 1073.3 |
| 2 | 1313.6 | 1188.7 |
| 10 | 1521.6 | 1472.3 |
| 20 | 1596.1 | 1573.5 |
| 50 | 1551.7 | 1534.6 |

MULTILAYER BODY AND METHOD FOR PRODUCING SAME

CROSS-REFERENCE TO RELATED APPLICATIONS

The present application is a 35 U.S.C. §§ 371 national phase conversion of PCT/JP2019/006898, filed Feb. 22, 2019, which claims priority to Japanese Patent Application No. 2018-031293, filed Feb. 23, 2018, the contents of which are incorporated herein by reference. The PCT International Application was published in the Japanese language.

TECHNICAL FIELD

The present invention relates to a multilayer body (stacking layer) that is used as a negative electrode for a lithium-ion secondary battery which is excellent in terms of safety and economic efficiency and has high capacity and high cycle characteristics, and a method for producing the same.

BACKGROUND ART

A lithium-ion secondary battery mainly includes a positive electrode containing a positive electrode-active material, a negative electrode containing a negative electrode-active material, and an electrolyte interposed between the electrodes. The performance of the lithium-ion secondary battery significantly depends on the characteristics of the electrode-active materials of the positive electrode and the negative electrode. Carbon-based materials such as graphite and hard carbon are broadly distributed as negative electrode-active materials for lithium-ion secondary batteries. The theoretical charging capacity of a lithium-ion secondary battery for which a carbon-based material is used as the negative electrode-active material is 372 mAh/g. The distribution of lithium-ion secondary batteries for automobiles, mobile phones, and the like intensifies a need for increasing the charging capacity.

The theoretical charging capacity of a lithium-ion secondary battery for which silicon is used as the negative electrode-active material is approximately 4200 mAh/g. Therefore, silicon is anticipated as a next-generation active material, and the development of negative electrode-active materials using silicon is underway. However, silicon is said to have a volume expansion and contraction rate of 400%, and silicon expands and contracts during the lithiation and delithiation in charging and discharging. Therefore, in lithium-ion secondary batteries in which silicon is used for the negative electrode, it is extremely difficult to cause a reversible charge and discharge reaction. As one of the solutions to large expansion and contraction, there is an attempt to use silicon oxide including silicon monoxide as a negative electrode-active material.

The charge reaction of silicon monoxide occurs according to the following reaction formula.

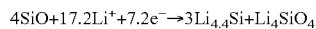

$4SiO + 17.2Li^+ + 7.2e^- \rightarrow 3Li_{4.4}Si + Li_4SiO_4$ $Li_4SiO_4$ is a stable substance and thus serves as an element with an irreversible capacity in the first charging. Meanwhile, the theoretical capacity of a lithium-ion secondary battery for which only $Li_{4.4}Si$ is used as the negative electrode-active material is 2011 mAh/g, which is more than five times larger than the theoretical charging capacity of a lithium-ion secondary battery for which a carbon-based material is used as the negative electrode-active material. However, since silicon monoxide has insulating properties, it is necessary to impart conductivity in order to make silicon monoxide serve as an electrode.

Generally, an electrode for a secondary battery is produced by attaching an active material and a conductive additive to the surface of a current collector with a binder. A negative electrode is known which is produced by applying a mixture of SiO or $SiO_x$ powder coated with a conductive additive, graphite, and a binder to a copper foil, drying and then pressing the mixture according to a conventional method as described above (Patent Literature 1). A lithium-ion secondary battery for which this negative electrode is used has a charging capacity of approximately 1500 mAh/g, excluding the initial irreversible capacity, which is approximately 75% of the theoretical value. As described above, it is known that silicon oxide $SiO_x$ is promising as a negative electrode-active material for lithium-ion secondary batteries having a high charging capacity. However, silicon oxide that charges and discharges lithium-ion secondary batteries at a charging capacity close to the theoretical charging capacity when used as the negative electrode-active material has not yet been developed.

CITATION LIST

Patent Literature

[Patent Literature 1]
  Japanese Unexamined Patent Application, First Publication No. 2004-47404

Non-Patent Literature

[Non-Patent Literature 1]
  U. S. Vogl et al., Langmuir, 30, 10299-10307 (2014)
[Non-Patent Literature 2]
  M. Mamiya et al., J. Crystal Growth, 229, 457-461 (2001)

SUMMARY OF INVENTION

Technical Problem

The present invention has been made in view of such circumstances, and an object of the present invention is to provide a multilayer body that is used as negative electrodes of lithium-ion secondary batteries, which have a high capacity and are excellent in terms of safety, economic efficiency, and cycle characteristics.

Solution to Problem

Silicon oxide charges and discharges lithium-ion secondary batteries through the formation and decomposition of lithium silicide. At this time, a significant volume change is caused. This volume change destroys the electrode structure, which hinders charging and discharging in a high capacity. This also has been a problem in other silicon-based electrodes. This problem is solved by miniaturizing the electrode-active material and imparting sufficient conductivity.

That is, a multilayer body of the present invention has a conductive substrate and a composite layer including a plurality of particles of silicon oxide that is provided on the conductive substrate and has an average particle diameter of 1.0 µm or less and a conductive substance that is present in gaps between the plurality of particles of silicon oxide.

A method for producing a multilayer body of the present invention has a film formation step of forming a silicon oxide layer containing a plurality of particles of silicon oxide on a conductive substrate by vapor deposition or sputtering and an application step of applying a mixture containing a conductive substance and a binding agent onto the silicon oxide layer, infiltrating the conductive substance into the silicon oxide layer, and forming a conductive layer containing the conductive substance on the silicon oxide layer.

Another method for producing a multilayer body of the present invention has a film formation step of forming a silicon oxide layer containing a plurality of particles of silicon oxide on a conductive substrate by vapor deposition or sputtering, an oxidation step of oxidizing the silicon oxide layer to convert the silicon oxide layer into an amorphous silicon oxide layer including amorphous silicon oxide in at least a part of the amorphous silicon oxide layer, and an application step of applying a mixture containing a conductive substance and a binding agent onto the amorphous silicon oxide layer, infiltrating the conductive substance into the amorphous silicon oxide layer, and forming a conductive layer containing the conductive substance on the amorphous silicon oxide layer.

Still another method for producing a multilayer body of the present invention has a film formation step of forming a silicon oxide layer containing a plurality of particles of silicon oxide on a conductive substrate by vapor deposition or sputtering, an oxidation step of oxidizing the silicon oxide layer to convert the silicon oxide layer into a mixed layer including amorphous silicon oxide and silicon, and an application step of applying a mixture containing a conductive substance and a binding agent onto the mixed layer, infiltrating the conductive substance into the mixed layer, and forming a conductive layer containing the conductive substance on the mixed layer.

A lithium-ion secondary battery of the present invention has a positive electrode, a negative electrode including the multilayer body of the present invention, and an electrolyte.

Advantageous Effects of Invention

According to the present invention, it is possible to obtain a lithium-ion secondary battery that has a high capacity and is excellent in terms of safety, economic efficiency, and cycle characteristics.

DESCRIPTION OF EMBODIMENT

Figure 1:
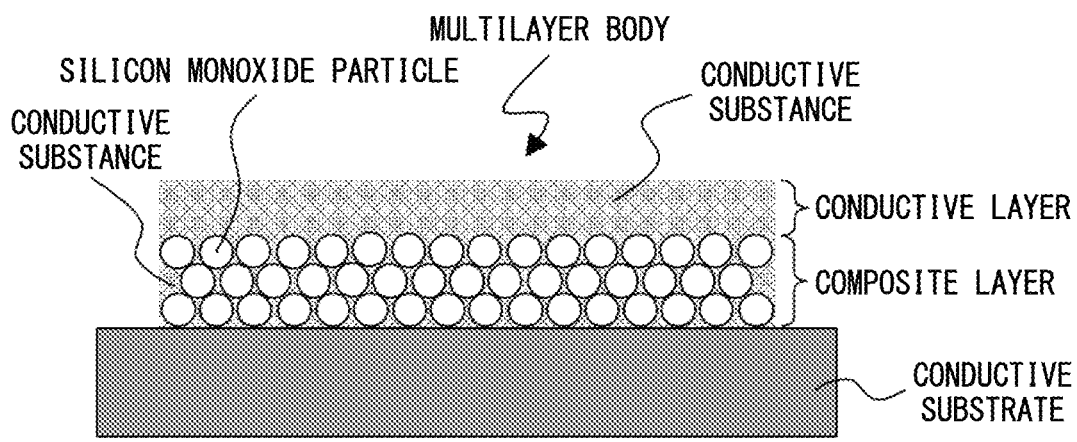
FIG. 1 is a cross-sectional schematic view of a multilayer body of an embodiment.

Hereinafter, a multilayer body, a method for producing a multilayer body, and a lithium-ion secondary battery of the present invention will be described based on an embodiment and examples with reference to drawings. It should be noted that duplicate description will not be made as appropriate. FIG. 1 schematically shows a cross section of a multilayer body according to the embodiment of the present invention. In FIG. 1, dimensions and dimensional ratios in the drawing do not always match the actual dimensions and dimensional ratios of the multilayer body. As shown in FIG. 1, the multilayer body of the present embodiment includes a conductive substrate and a composite layer provided on the conductive substrate.

The material, shape, size, and the like of the conductive substrate are not particularly limited as long as the conductive substrate is a conductive substrate. However, the conductive substrate is preferably a metal base plate capable of withstanding high temperatures in an inert gas. This is because a silicon oxide layer can be easily formed on the conductive substrate by a vacuum vapor deposition method. In the present embodiment, the silicon oxide is silicon monoxide, and a plurality of silicon monoxide particles is precipitated on the conductive substrate by the vacuum vapor deposition method. The composite layer includes a plurality of particles of silicon oxide having an average particle diameter of 1.0 µm or less and a conductive substance present in gaps between the plurality of particles of silicon oxide.

The average particle diameter of the particles of silicon oxide is calculated by measuring the diameters of particles in a surface SEM image of the silicon oxide layer. For example, it is possible to measure the diameters of several tens of silicon oxide particles captured in the SEM image and regard the number-average value of the measured diameters as the average particle diameter of silicon oxide. In order to obtain a high-capacity lithium-ion secondary battery when the multilayer body is used as a negative electrode, the silicon oxide is preferably amorphous silicon oxide represented by silicon monoxide (SiO) or $SiO_x$ ($1<x<2$). In addition, the plurality of particles of silicon oxide may be a mixture of the particles of amorphous silicon oxide represented by $SiO_x$ ($1<x<2$) and the particles of silicon.

Silicon monoxide is a stable amorphous substance made up of Si and O in an atomic ratio of 1:1. A crystalline body of silicon monoxide has not yet been discovered. There is a theory that silicon monoxide is a mixture of $SiO_2$ and microcrystalline Si. The mixture of $SiO_2$ and Si according to this theory is also the silicon monoxide that is mentioned in the present application. In addition, when silicon monoxide is heated in a deoxygenated atmosphere, and a disproportionation reaction is caused, a mixture of amorphous silicon oxide represented by $SiO_x$ ($1<x<2$) and Si is obtained.

In addition, when silicon monoxide is heated in an oxygen atmosphere and oxidized, amorphous silicon oxide represented by $SiO_x$ ($1<x<2$) is obtained. In the present embodiment, a plurality of silicon monoxide particles is precipitated on the conductive substrate by the vacuum vapor deposition method. Therefore, the average particle diameter of the silicon monoxide is as small as approximately 0.2 μm or less. In a case where silicon monoxide is pulverized by an ordinary mechanical milling method using a ball mill or the like, the minimum particle diameter is approximately 1 μm.

In addition, the multilayer body of the present embodiment further includes a conductive layer containing a conductive substance on the composite layer. The thicknesses of the composite layer and the conductive layer are both preferably several micrometers to several tens of micrometers and both more preferably 20 μm or less. In the present embodiment, the conductive substance present in the gaps between the silicon monoxide particles and the conductive substance contained in the conductive layer are the same. Examples of the conductive substance include carbon black that is commercially available as acetylene black, Ketjen black, or the like. The conductive substance present in the gaps between the particles of silicon oxide is present in order to build a conduction path between the silicon oxide and the conductive substrate. As long as such an object can be achieved, the material, shape, or the like of the conductive substance is not particularly limited.

The method for producing a multilayer body according to the embodiment of the present invention includes a film formation step and an application step. In the film formation step, a silicon oxide layer containing a plurality of particles of silicon oxide is formed on the conductive substrate by vapor deposition or sputtering. More specifically, for example, the silicon monoxide powder of a reagent, which is a vapor deposition source, and a copper base plate, which is a conductive substrate, are installed and heated in a tubular furnace having a vacuum atmosphere. At this time, the silicon monoxide powder and the copper base plate are installed at in-furnace positions such that the temperatures thereof reach approximately 1000° C. and approximately 400° C., respectively. In addition, when this tubular furnace is heated for 20 hours, a silicon monoxide layer formed of silicon monoxide particles having a small average particle diameter is formed on the copper base plate by vacuum vapor deposition.

A mixture of silicon and silicon dioxide may also be used as the vapor deposition source. In addition, the heating temperature of the vapor deposition source is not particularly limited as long as the vapor deposition source vaporizes at the heating temperature. In a case where the heating temperature of the conductive substrate reaches 800° C. or higher, there is a possibility that the disproportionation reaction of silicon monoxide may occur at the same time as the vapor deposition of the silicon monoxide particles. However, even in such a case, the silicon monoxide layer functions as an electrode-active material layer. However, silicon monoxide is not the only substance to be vapor-deposited, and, in order to prevent an adverse influence on the conductive characteristics of the obtained multilayer body, the conductive substrate is desirably heated at a temperature at which the disproportionation reaction of silicon monoxide does not occur.

The silicon oxide is preferably silicon monoxide. Since the silicon oxide layer is formed on the conductive substrate by vapor deposition, the average particle diameter of the particles of silicon oxide that form the silicon oxide layer is small. The average particle diameter of the particles of silicon oxide of the present embodiment is 1.0 μm or less, for example, approximately 0.2 μm or less. The silicon oxide layer may be formed on the conductive substrate by a sputtering method instead of the vacuum vapor deposition method.

In the application step, a mixture containing a conductive substance and a binding agent is applied onto the silicon oxide layer, the conductive substance is infiltrated into the silicon oxide layer, and a conductive layer containing the conductive substance is formed on the silicon oxide layer. The mixture may contain a dispersion medium. In the present embodiment, the mixture is a slurry containing carbon black as the conductive substance, an aqueous binder as the binding agent, and water as the dispersion medium. The particle diameter of the conductive substance is preferably small. This is because the conductive substance easily infiltrates the silicon oxide layer.

The aqueous binder forms the slurry together with a substance to be bound, such as carbon black, and water, which is the dispersion medium. When this slurry is applied to the substrate and dried, the molecules of the substance to be bound are bound to each other on the substrate. Examples of the aqueous binder include carboxymethyl cellulose (CMC), styrene-butadiene copolymer (SBR), and the like. The binding agent may be a non-aqueous binder. The slurry containing the conductive substance and the binding agent is applied onto the silicon oxide layer and dried, whereby a mixed layer and a conductive layer are formed. The conductive substance may be deposited in the inside and on the upper surface of the silicon oxide layer by a sputtering method or the like.

The average particle diameter of ordinary carbon black as the conductive substance is approximately 35 nm. Since the average particle diameter of the conductive substance is approximately a $\frac{1}{10}$ level of the average particle diameter of the particles of silicon oxide that form the silicon oxide layer, the conductive substance is capable of infiltrating the silicon oxide layer. Since the conductive substance that has infiltrated the silicon oxide layer imparts conductivity to the silicon oxide layer, a lithium-ion secondary battery for which the multilayer body of the present embodiment is used as the negative electrode can be charged and discharged in a high capacity with excellent cycle characteristics. The thickness of the silicon oxide layer may not be constant. In addition, the silicon oxide layer may be formed in an island shape. Furthermore, a part of the conductive layer may be in direct contact with the conductive substrate.

A method for producing a multilayer body according to another embodiment of the present invention includes a film formation step, an oxidation step, and an application step. The film formation step is as described above. In the oxidation step, the silicon oxide layer is oxidized and converted into an amorphous silicon oxide layer. In the application step, a mixture containing a conductive substance and a binding agent is applied onto the amorphous silicon oxide layer, the conductive substance is infiltrated into the amorphous silicon oxide layer, and a conductive layer containing the conductive substance is formed on the amorphous silicon oxide layer.

Furthermore, a method for producing a multilayer body of still another embodiment of the present invention includes a film formation step, a heating step, and an application step. The film formation step is as described above. In the heating step, the silicon oxide layer is heated and converted into a mixed layer including amorphous silicon oxide and silicon. More specifically, the silicon oxide layer formed on the conductive base plate, for example, a silicon monoxide layer, is heat-treated at 800° C. to 1200° C. for four hours to 10 hours in an inert gas atmosphere to produce a mixed layer including amorphous silicon oxide, which is a disproportionation reaction product, and silicon.

Non-Patent Literature 2 discloses the relationship between the heat treatment temperature of the disproportionation reaction of silicon monoxide and the progress of the reaction. The theoretical charging capacity of a lithium-ion secondary battery for which silicon is used as the negative electrode is 4200 mAh/g. According to Non-Patent Literature 2, since the element of microcrystalline silicon generated by the disproportionation reaction is added, the capacity of a lithium-ion secondary battery for which the multilayer body that has been heat-treated is used as the negative electrode increases to be higher than the capacity of a lithium-ion secondary battery for which the multilayer body yet to be heat-treated is used as the negative electrode. In the application step, a mixture containing a conductive substance and a binding agent is applied onto the mixed layer, the conductive substance is infiltrated into the mixed layer, and a conductive layer containing the conductive substance is formed on the mixed layer.

A lithium-ion secondary battery according to the embodiment of the present invention includes a positive electrode, a negative electrode including the multilayer body of the present embodiment, and an electrolyte. The multilayer body of the present embodiment can also be used for negative electrodes in lithium-ion capacitors that operate by the same mechanism as lithium-ion secondary batteries.

EXAMPLES (Production of Multilayer Body Including Copper Base Plate (Sample 2))

Figure 2:
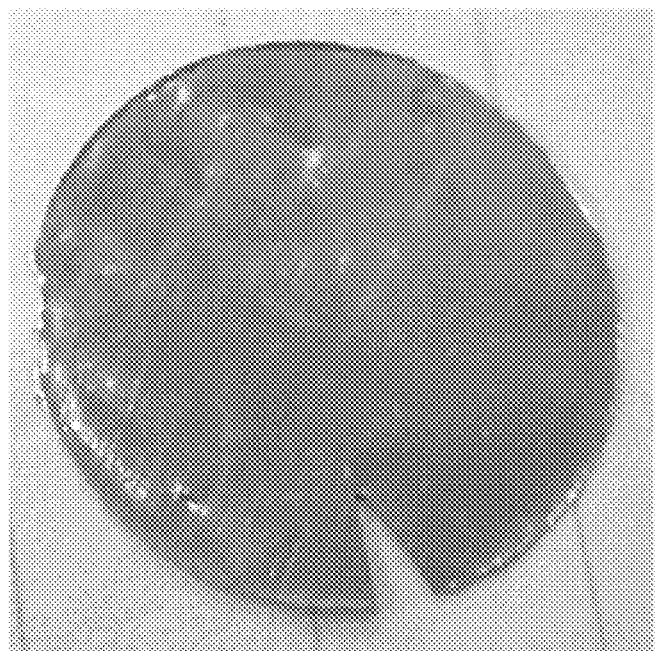
FIG. 2 is an image of the appearance of Sample 1.

A silicon monoxide powder (manufactured by Kishida Chemical Co., Ltd.) was placed at the in-furnace central part of a tubular furnace (Koyo Thermo Systems Co., Ltd., KTF045N1). This central part is a uniform temperature part in the furnace. A copper disc having a diameter of 15 mm and a thickness of 0.02 mm was installed at a point 30 cm away from the central part in the furnace. A vacuum atmosphere was formed in the furnace, the silicon monoxide powder was heated at a central part temperature of 1000° C. for 20 hours, and the silicon monoxide was vapor-deposited in a vacuum on the copper disc, thereby obtaining Sample 1. At this time, the temperature near the copper disc was approximately 400° C. A photograph of the appearance of Sample 1 is shown in FIG. 2. As shown in FIG. 2, it was confirmed that a silicon monoxide layer was formed on the copper disc. In addition, from a change in the mass of the sample before and after the vacuum vapor deposition, it was found that 0.20 mg of silicon monoxide particles was vapor-deposited on the copper disc.

Figure 3:
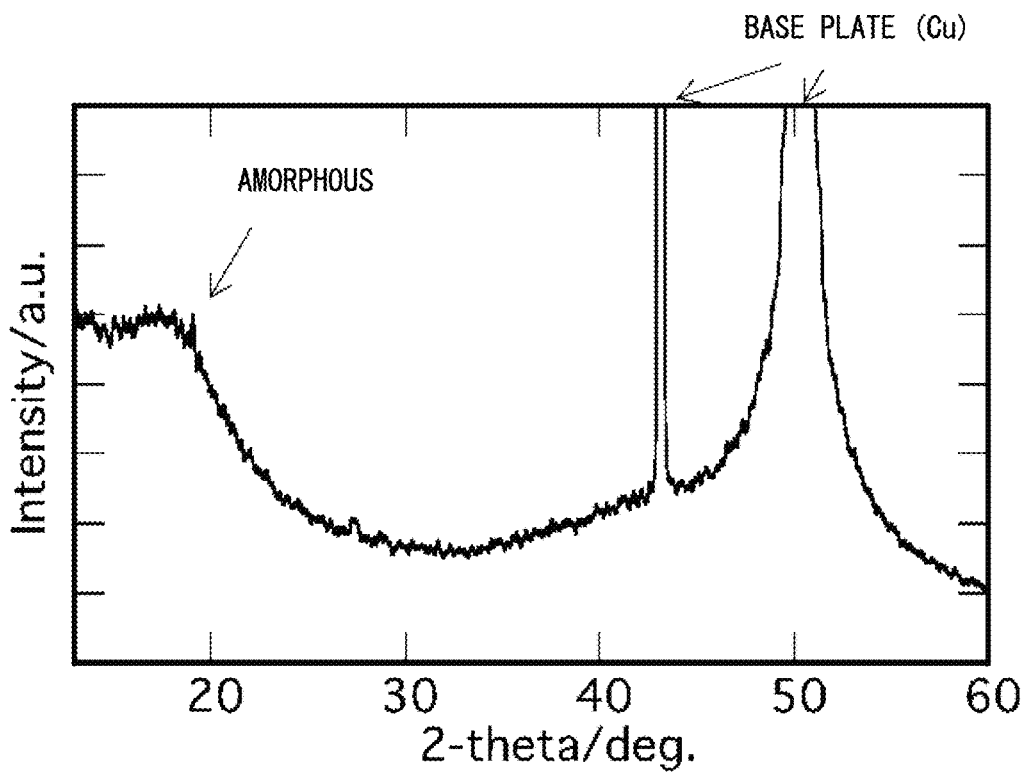
FIG. 3 is an XRD chart of the surface of Sample 1.
Figure 4:
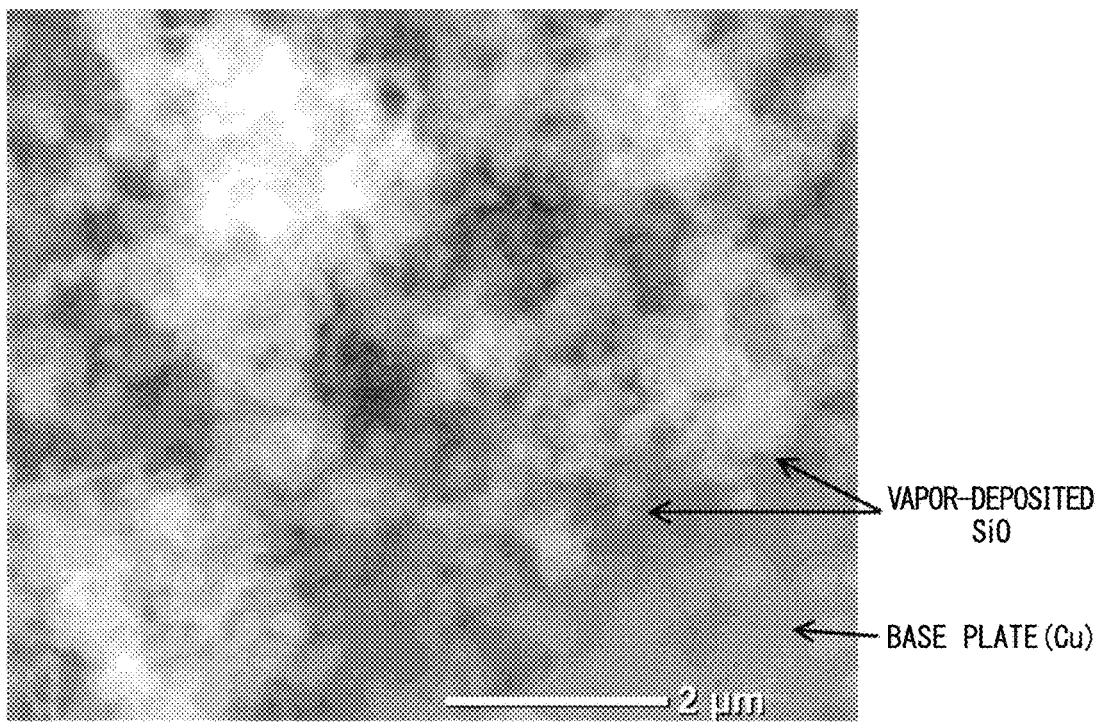
FIG. 4 is an SEM image of the surface of Sample 1.

XRD measurement was carried out on the surface of Sample 1. This XRD chart is shown in FIG. 3. As shown in FIG. 3, a halo pattern derived from an amorphous material ("amorphous" in the drawing) was observed at 2θ of near 20°. In addition, only a diffraction peak derived from the crystals of the copper plate ("base plate (Cu)" in the drawing) was present in the XRD chart. Furthermore, the surface of Sample 1 was observed with SEM. This SEM image is shown in FIG. 4. As shown in FIG. 4, a layer of silicon monoxide particles having a particle diameter of approximately 0.2 μm ("vapor-deposited SiO" in the drawing) was observed. However, this silicon monoxide layer was not uniform, and the copper plate ("base plate (Cu)" in the drawing) was partially exposed.

Figure 5:
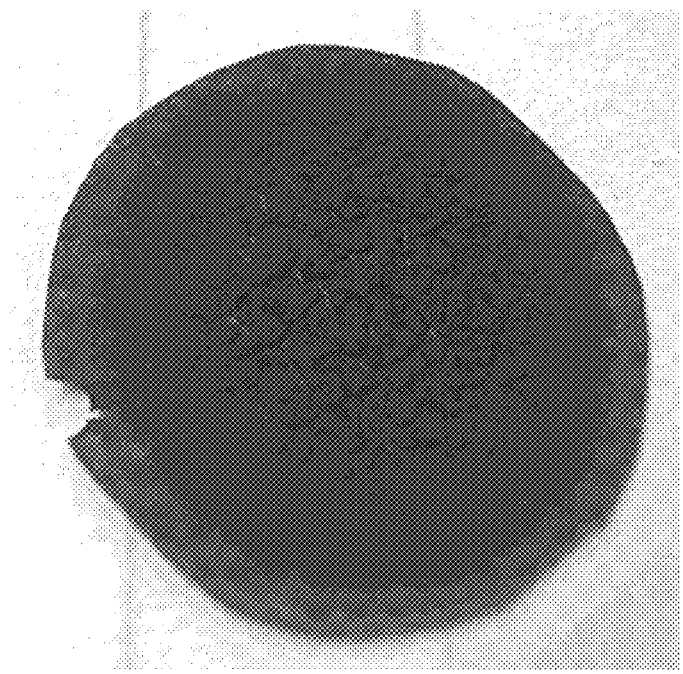
FIG. 5 is an image of the appearance of Sample 2.

Acetylene black (Denka Company Limited., particle diameter: 35 nm), which is a conductive substance, and 2 mass % CMC of acetylene black were mixed together, and this mixture was uniformly dispersed in water to produce a slurry. This slurry was applied to the surface of Sample 1 and naturally dried to obtain Sample 2, which was a multilayer body. The mass of Sample 2 was increased by 3.19 mg from the mass of Sample 1. A photograph of the appearance of Sample 2 is shown in FIG. 5.

Figure 6:
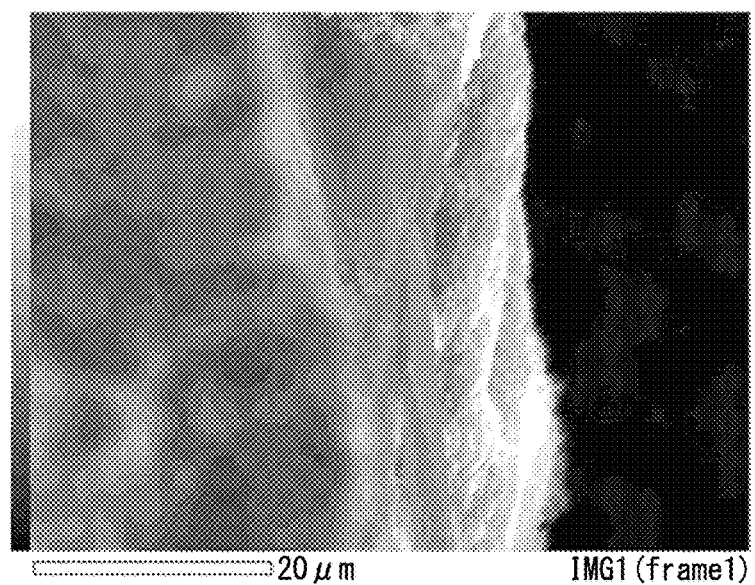
FIG. 6 is a cross-sectional SEM image of Sample 2.
Figure 7:
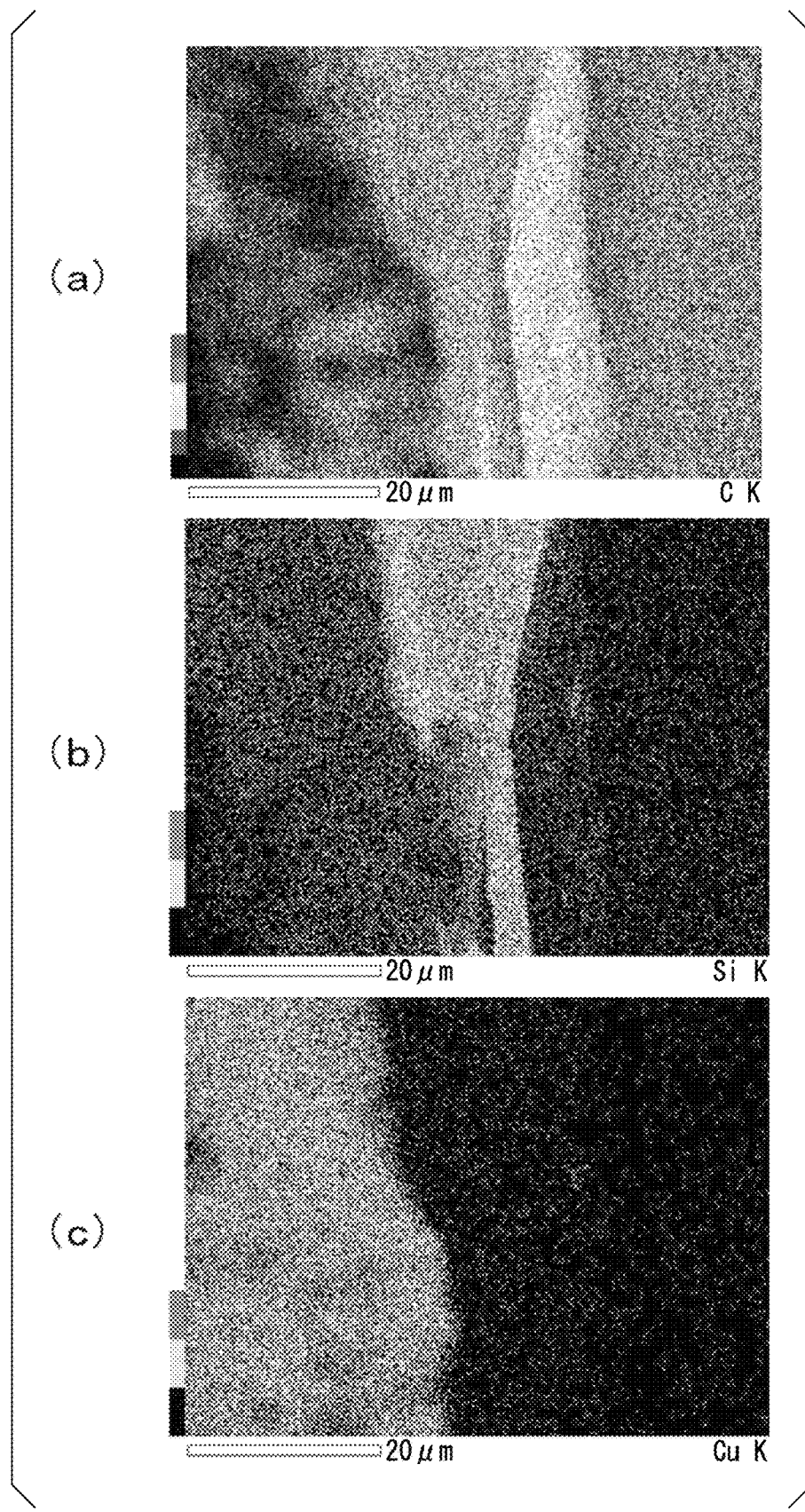
FIG. 7 is a composition distribution image of a cross section of Sample 2.

In addition, a cross-sectional SEM photograph of Sample 2 is shown in FIG. 6. As shown in FIG. 6, acetylene black infiltrated the layer of silicon monoxide particles. With this acetylene black, the multilayer body has conductivity suitable for electrodes. The composition analysis result of the cross section of Sample 2 is shown in FIG. 7. FIG. 7(a) shows the distribution of carbon (C), FIG. 7(b) shows the distribution of silicon (Si), and FIG. 7(c) shows the distribution of copper (Cu). Each element is present in the lighter-colored part. As shown in FIG. 7, the silicon monoxide layer having a thickness of approximately 10 μm was present on the copper base plate, and furthermore, a carbon layer having a thickness of approximately 10 μm was present on the silicon monoxide layer. In addition, as shown in FIG. 7(a), it was also possible to confirm that carbon was also present in the silicon monoxide layer. In FIG. 6 and FIG. 7, the right direction is the upward direction of the multilayer body.

(Evaluation of Lithium-Ion Secondary Battery for which Sample 2 was Used as Negative Electrode)

A lithium-ion secondary battery such as a 2032-type coin cell or a flat cell in which Sample 2 was used as the negative electrode and lithium metal was used as the positive electrode was produced. A solution prepared by adding a lithium salt ($LiPF_6$) to a solvent to a concentration of 0.1 M was used as an electrolytic solution. The solvent was prepared by mixing ethylene carbonate (EC) and dimethyl carbonate (DMC) in the same volume.

The charge and discharge characteristics of this lithium-ion secondary battery were evaluated in a 25° C. environment at a measurement potential of 0 V to 3.0 V and a quantity of electricity that flowed every second in a unit area that was perpendicular to the direction of current (hereinafter, simply referred to as "quantity of electricity") of 0.1 C. The quantity of electricity of 0.1 C is the quantity of electricity with which the lithium-ion secondary battery is fully charged in 10 hours. The charging capacity of the lithium-ion secondary battery when fully charged was set to 2011 mAh/g, which is the theoretical charging capacity of a lithium-ion secondary battery for which SiO is used as the negative electrode. Since Sample 2 was used as the negative electrode, an operation of lowering the potential toward 0 V was regarded as charging, and an operation of raising the potential toward 3.0 V was regarded as discharging. Therefore, during charging, lithium is intercalated into the silicon monoxide layer, and, during discharging, lithium is de-intercalated from the silicon monoxide layer.

Figure 8:
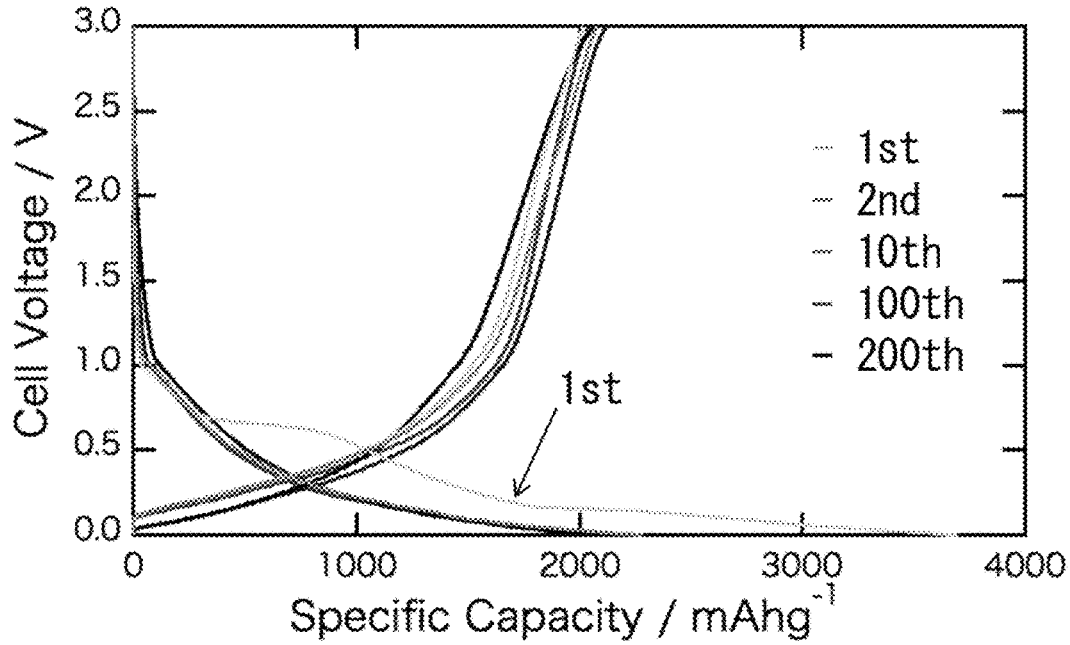
FIG. 8 is a graph of charge and discharge cycles of a lithium-ion secondary battery for which Sample 2 is used as the negative electrode and a table showing charging and discharging capacities in each cycle.

The graphs of the charge and discharge cycles of this lithium-ion secondary battery and the values of the charging capacity and the discharging capacity in each cycle are shown in FIG. 8. As shown in FIG. 8, in the charging process, a plateau is observed at a capacity of approximately 800 mAh/g and a voltage near 0.7 V only in the initial cycle. This capacity is almost the same as the capacity of Li necessary to generate $Li_4SiO_4$, which is an irreversible capacity component, from SiO. In the second and later cycles, the charging and discharging capacities were stable at near 2100 mAh/g, and, even after the $200^{th}$ cycle, capacity deterioration was rarely observed.

Figure 9:
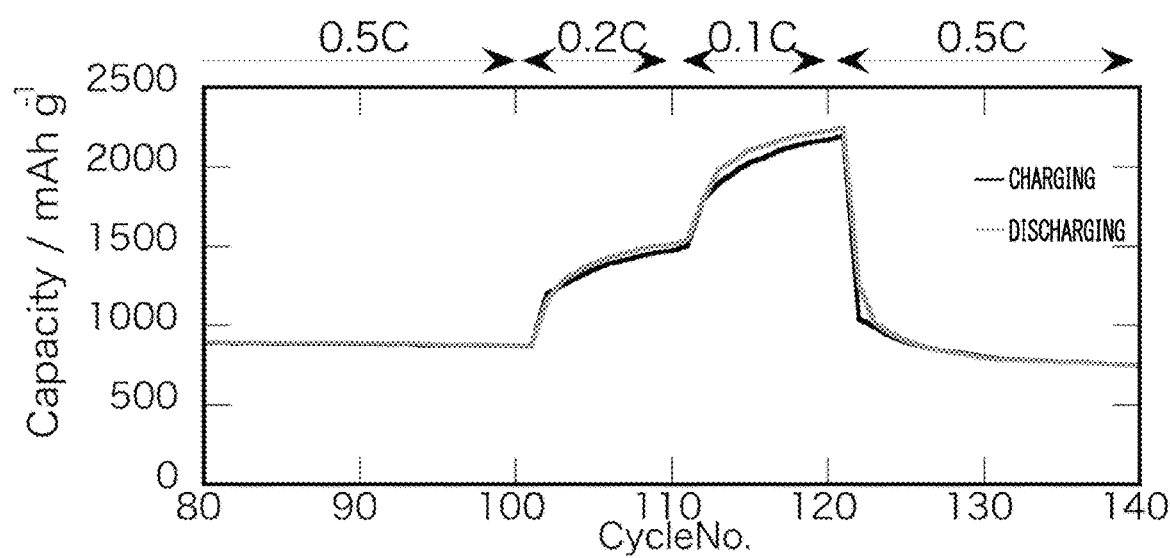
FIG. 9 is a graph showing the charging and discharging capacities when the quantity of electricity is changed in a lithium-ion secondary battery for which Sample 2 is used as the negative electrode.

In addition, the charging and discharging capacities of lithium-ion secondary batteries produced in the same manner were measured at different quantities of electricity. The results are shown in FIG. 9. As shown in FIG. 9, at a quantity of electricity of 0.5 C, this lithium-ion secondary battery showed stable cycles at charging and discharging capacities of approximately 900 mAh/g. As a result of decreasing the quantity of electricity to 0.2 C at the $100^{th}$ cycle, the charging and discharging capacities increased to approximately 1500 mAh/g. After that, when the quantity of electricity was decreased to 0.1 C, the charging and discharging capacities increased to approximately 2100 mAh/g. Furthermore, when the quantity of electricity was returned to 0.5 C, the continuing measurement showed that the charging and discharging capacities were stabilized at approximately 900 mAh/g, which was the same as the charging and discharging capacities until the $100^{th}$ cycle.

(Production of Multilayer Body Including Copper Base Plate and Disproportionation Reaction Product of Silicon Monoxide (Sample 3))

Sample 3 was produced by the same method as the method for producing Sample 2 except that a heating step of carrying out a heat treatment at 900° C. for 4 hours in an argon atmosphere was added between the step of vapor-depositing silicon monoxide in a vacuum on the copper disc and the step of applying the slurry containing acetylene black to the surface of the silicon monoxide layer.

(Evaluation of Lithium-Ion Secondary Battery for which Sample 3 was Used as Negative Electrode)

Figure 10:
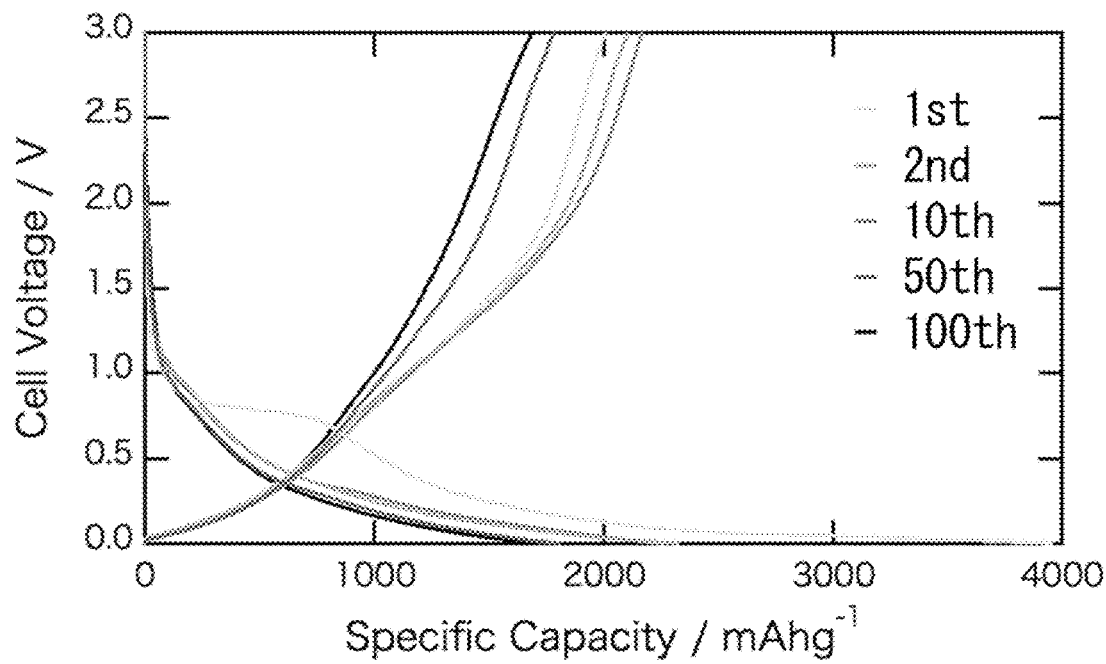
FIG. 10 is a graph of charge and discharge cycles of a lithium-ion secondary battery for which Sample 3 is used as the negative electrode and a table showing charging and discharging capacities in each cycle.

The charge and discharge characteristics of a lithium-ion secondary battery for which Sample 3 was used as the negative electrode were evaluated in the same manner as the evaluation of the lithium-ion secondary battery for which Sample 2 was used as the negative electrode. The results are shown in FIG. 10. As shown in FIG. 10, the charging and discharging capacities after the $100^{th}$ cycle decreased by 25% or more compared with the charging and discharging capacities in the second cycle. This is considered to be because the volume of microcrystalline silicon that was generated by the disproportionation reaction of silicon monoxide expanded in association with charging and discharging. It should be noted that, as disclosed in Non-Patent Literature 2, the crystals of silicon generated by the disproportionation reaction caused when silicon monoxide is heat-treated at 900° C. are too small to be confirmed even with a transmission electron microscope and are so small that the crystals of silicon are confirmed from a change in the pattern derived from the peak of silicon, which is barely observable by XRD.

(Production of Multilayer Body Including Copper Base Plate and Disproportionation Reaction Product of Silicon Monoxide (Sample 4))

Sample 4 was produced by the same method as the method for producing Sample 3 except that the heat treatment temperature was changed to 1000° C. Under this heat treatment condition, as disclosed in Non-Patent Literature 2, silicon having a particle diameter of approximately 4 nm is generated due to the disproportionation reaction of silicon monoxide. However, the disproportionation reaction does not completely proceed, and a mixture of amorphous silicon oxide $SiO_x$ (1<x<2) and microcrystalline silicon is formed.

(Evaluation of Lithium-Ion Secondary Battery for which Sample 4 was Used as Negative Electrode)

Figure 11:
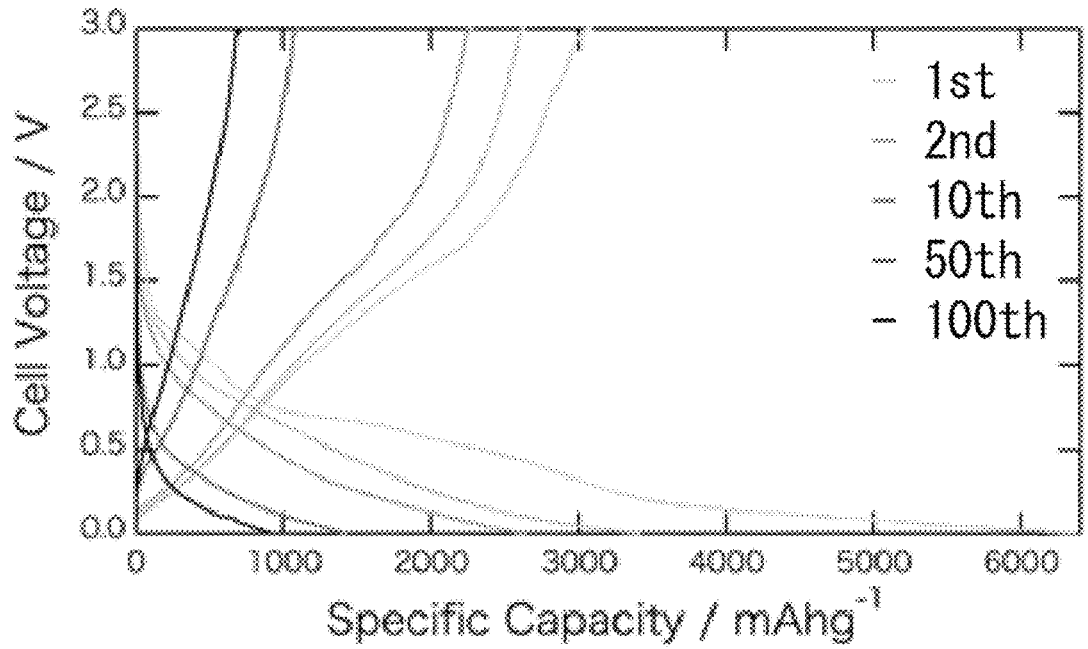
FIG. 11 is a graph of charge and discharge cycles of a lithium-ion secondary battery for which Sample 4 is used as the negative electrode and a table showing charging and discharging capacities in each cycle.

The charge and discharge characteristics of a lithium-ion secondary battery for which Sample 4 was used as the negative electrode were evaluated in the same manner as the evaluation of the lithium-ion secondary battery for which Sample 3 was used as the negative electrode. The results are shown in FIG. 11. As shown in FIG. 11, in the initial 10 cycles, the charging capacity of the lithium-ion secondary battery for which Sample 4 was used as the negative electrode was higher than the charging capacity of the lithium-ion secondary battery for which Sample 3 was used as the negative electrode. This is considered to be because, in Sample 4 produced by the heat treatment carried out at a temperature higher than the heat treatment temperature for the production of Sample 3, the disproportionation reaction of silicon monoxide proceeds further than in Sample 3, which increased the amount of silicon that made the lithium-ion secondary battery show a high capacity when Sample 4 was used as the negative electrode.

On the other hand, the cycle deterioration of the lithium-ion secondary battery for which Sample 4 was used as the negative electrode was significant. This is considered to be because, due to the charge and discharge cycle, the volume of silicon possibly expands up to approximately four times, and, in the lithium-ion secondary battery for which Sample 4 was used as the negative electrode, amorphous silicon oxide around silicon was not capable of sufficiently alleviating the volume expansion of silicon. However, compared with the charging capacity retention rate of a lithium-ion secondary battery for which only silicon was used as the negative electrode in the second cycle, the charging capacity retention rate (50% or more) of the lithium-ion secondary battery for which Sample 4 was used as the negative electrode in the second cycle was high. This shows that amorphous silicon oxide suppressed the deterioration of the charging capacity of the lithium-ion secondary battery.

(Production of Multilayer Body Including Stainless Steel Base Plate (Sample 6))

Figure 12:
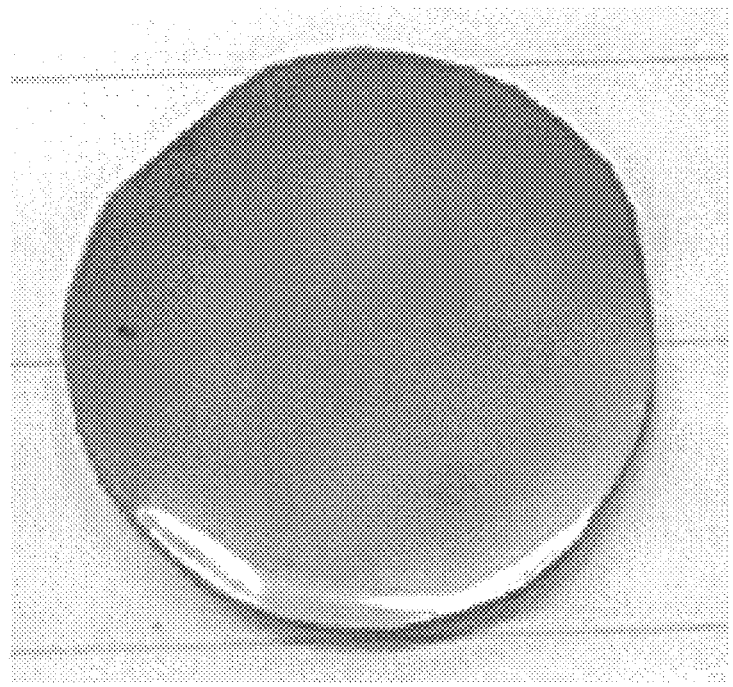
FIG. 12 is an image of the appearance of Sample 5.
Figure 13:
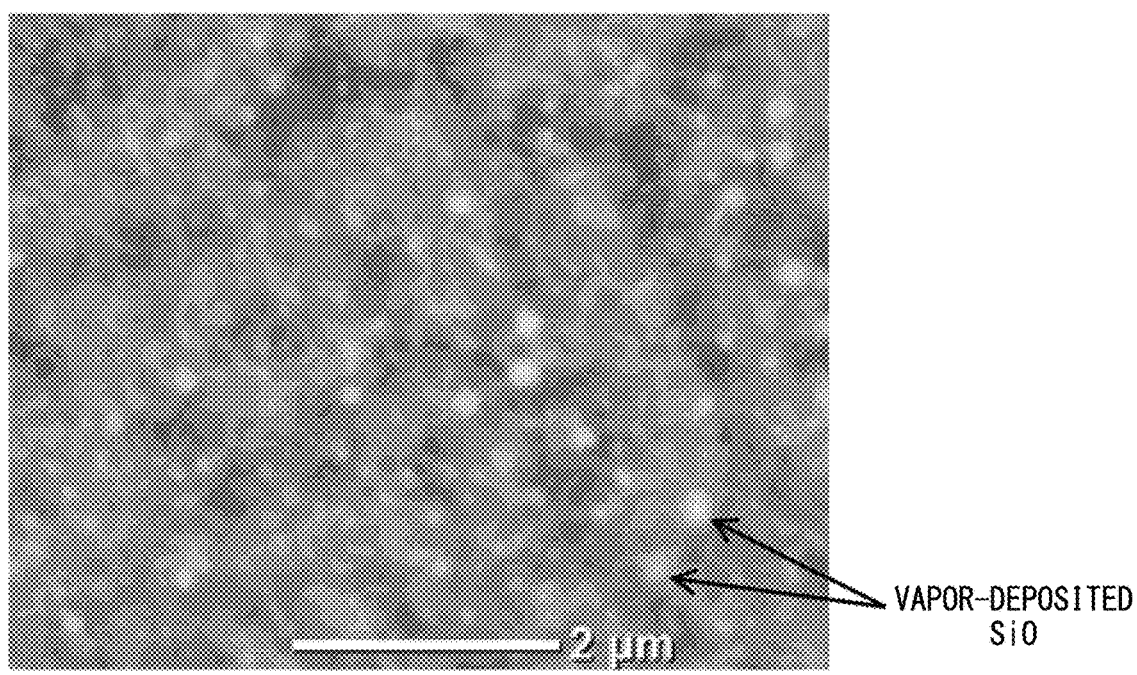
FIG. 13 is an SEM image of the surface of Sample 5.

Sample 5 was produced by the same method as the method for producing Sample 1 except that a stainless steel disc having a diameter of 15 mm and a thickness of 0.2 mm was used. A photograph of the appearance of Sample 5 is shown in FIG. 12. As shown in FIG. 12, it was confirmed that a silicon monoxide layer was formed on the stainless steel disc. From a change in the mass of the sample before and after the vacuum vapor deposition, it was found that 0.37 mg of silicon monoxide particles was vapor-deposited on the stainless steel disc. In addition, the surface of Sample 5 was observed with SEM. This SEM image is shown in FIG. 13. As shown in FIG. 13, silicon monoxide particles having a particle diameter of approximately 0.1 μm to 0.2 μm ("vapor-deposited SiO" in the drawing) were almost uniformly vapor-deposited on the stainless steel base plate.

Figure 14:
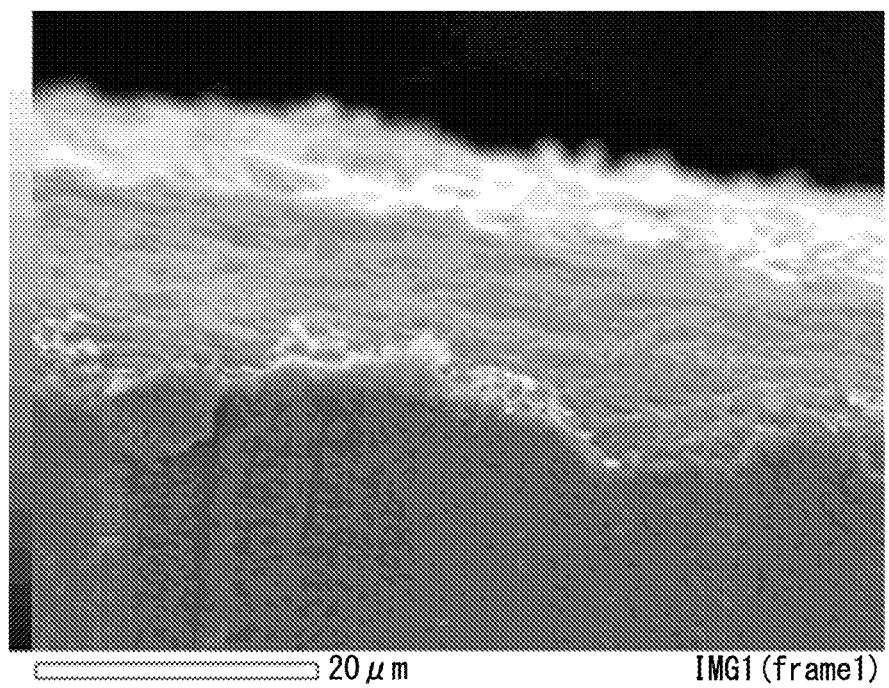
FIG. 14 is a cross-sectional SEM image of Sample 6.
Figure 15:
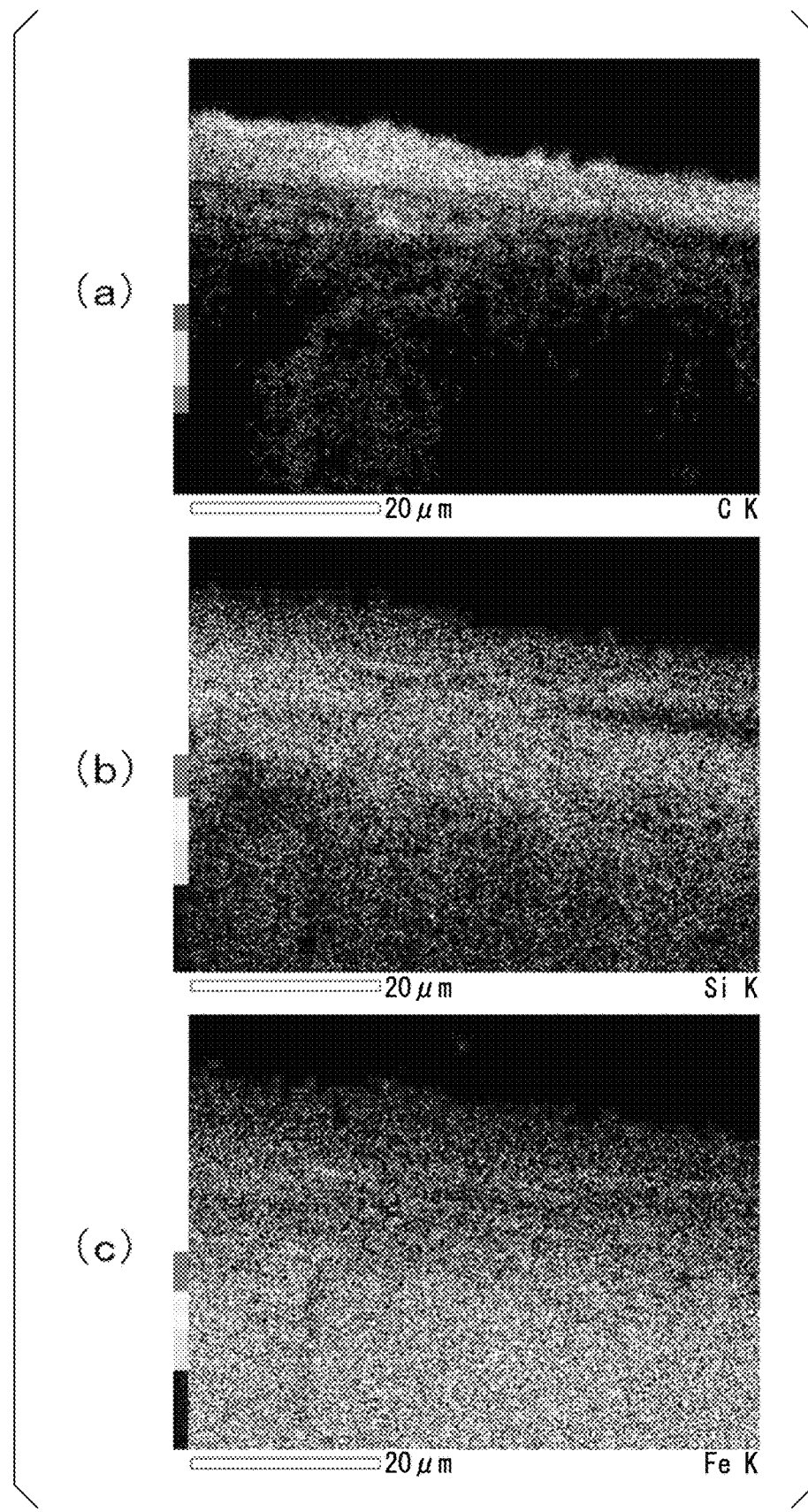
FIG. 15 is a composition distribution image of a cross section of Sample 6.

Sample 6 was produced using Sample 5 by the same method as the method for producing Sample 2 using Sample 1. The mass of Sample 6 was increased by 1.31 mg from the mass of Sample 5. A cross-sectional SEM photograph of Sample 6 is shown in FIG. 14. As shown in FIG. 14, the silicon monoxide layer having a thickness of approximately 15 μm was present on the stainless steel base plate, and furthermore, a carbon layer having a thickness of approximately 8 μm was present on the silicon monoxide layer. The composition analysis result of the cross section of Sample 6 is shown in FIG. 15. FIG. 15(a) shows the distribution of carbon (C), FIG. 15(b) shows the distribution of silicon (Si), and FIG. 15(c) shows the distribution of iron (Fe). Each element is present in the lighter-colored part. As shown in FIG. 15, it was possible to confirm that carbon was also present in the silicon monoxide layer.

(Evaluation of Lithium-Ion Secondary Battery for which Sample 6 was Used as Negative Electrode)

Figure 16:
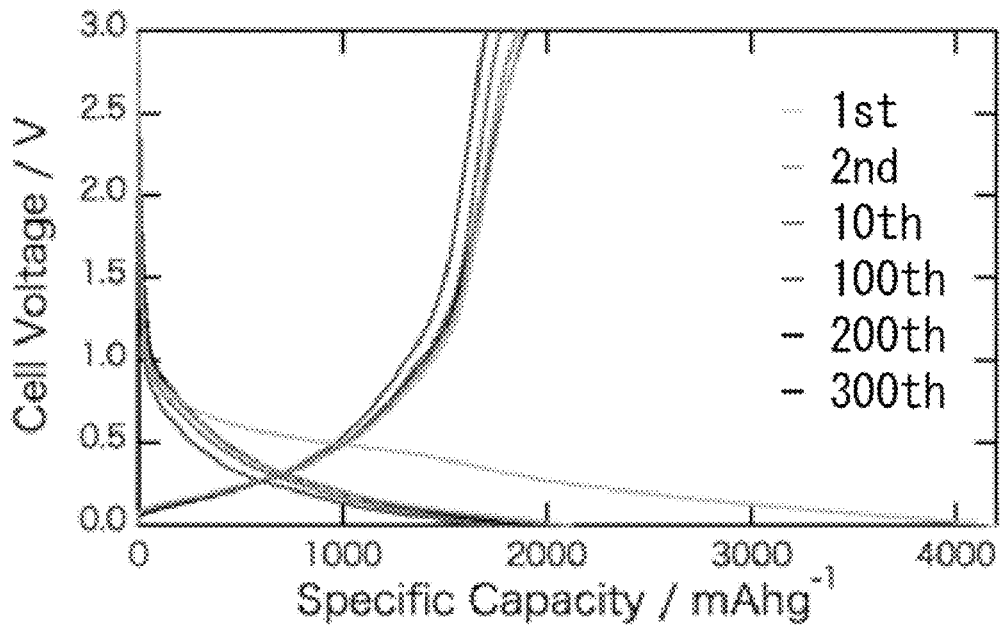
FIG. 16 is a graph of charge and discharge cycles of a lithium-ion secondary battery for which Sample 6 is used as the negative electrode and a table showing a charging and discharging capacity in each cycle.

The charge and discharge characteristics of a lithium-ion secondary battery for which Sample 6 was used as the negative electrode were evaluated in the same manner as the evaluation of the lithium-ion secondary battery for which Sample 2 was used as the negative electrode. The results are shown in FIG. 16. As shown in FIG. 16, the initial charging capacity was higher than the theoretical value; however, in the second and later cycles, the charging and discharging capacities were stable at approximately 1800 mAh/g, and these charging and discharging capacities were maintained until the $300^{th}$ cycle. The shape of the charging and discharging pattern in the graph was also rarely changed, and the intercalation and de-intercalation of lithium reversibly reacted. It was found that no noticeable influence of the difference between the copper base plate and the stainless steel base plate was observed and there is a degree of freedom in selecting the material of the base plate.

(Production of Multilayer Body Including Stainless Steel Base Plate (Sample 7))

Acetylene black, which is a conductive substance, and polyvinylidene fluoride (Kureha Battery Materials Japan Co.,Ltd., KUREHA KF Polymer, L#1120), which is a non-aqueous binder, were mixed together at a mass ratio of 1:1, and dimethyl carbonate was added thereto as a dispersion medium, thereby obtaining a dispersion liquid. Sample 7 was produced using Sample 5 by the same method as the method for producing Sample 6 using Sample 5 except that the dispersion liquid was used instead of the slurry. The mass of Sample 7 was increased by 1.41 mg from the mass of Sample 5.

Figure 17:
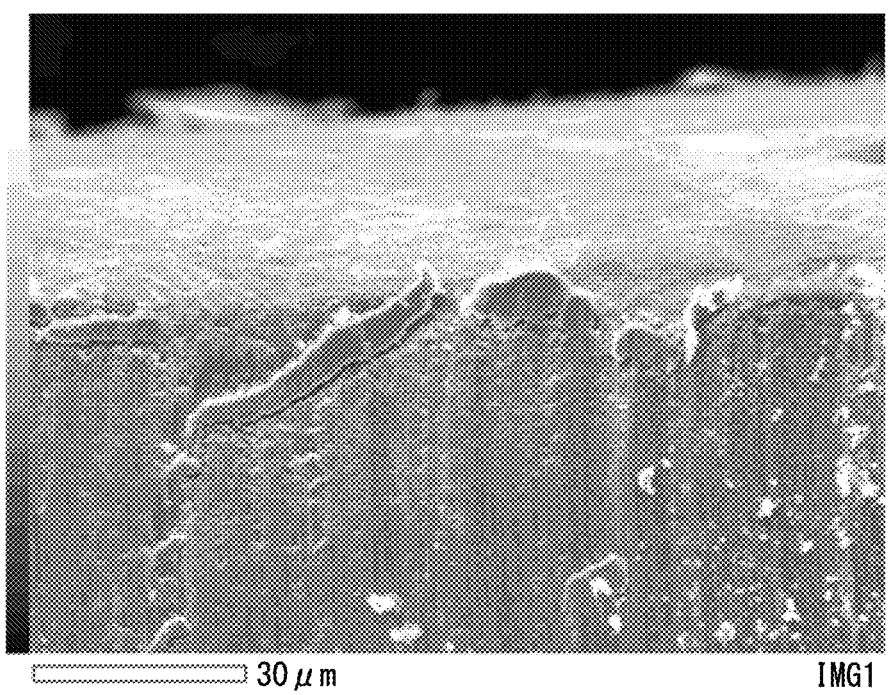
FIG. 17 is a cross-sectional SEM image of Sample 7.
Figure 18:
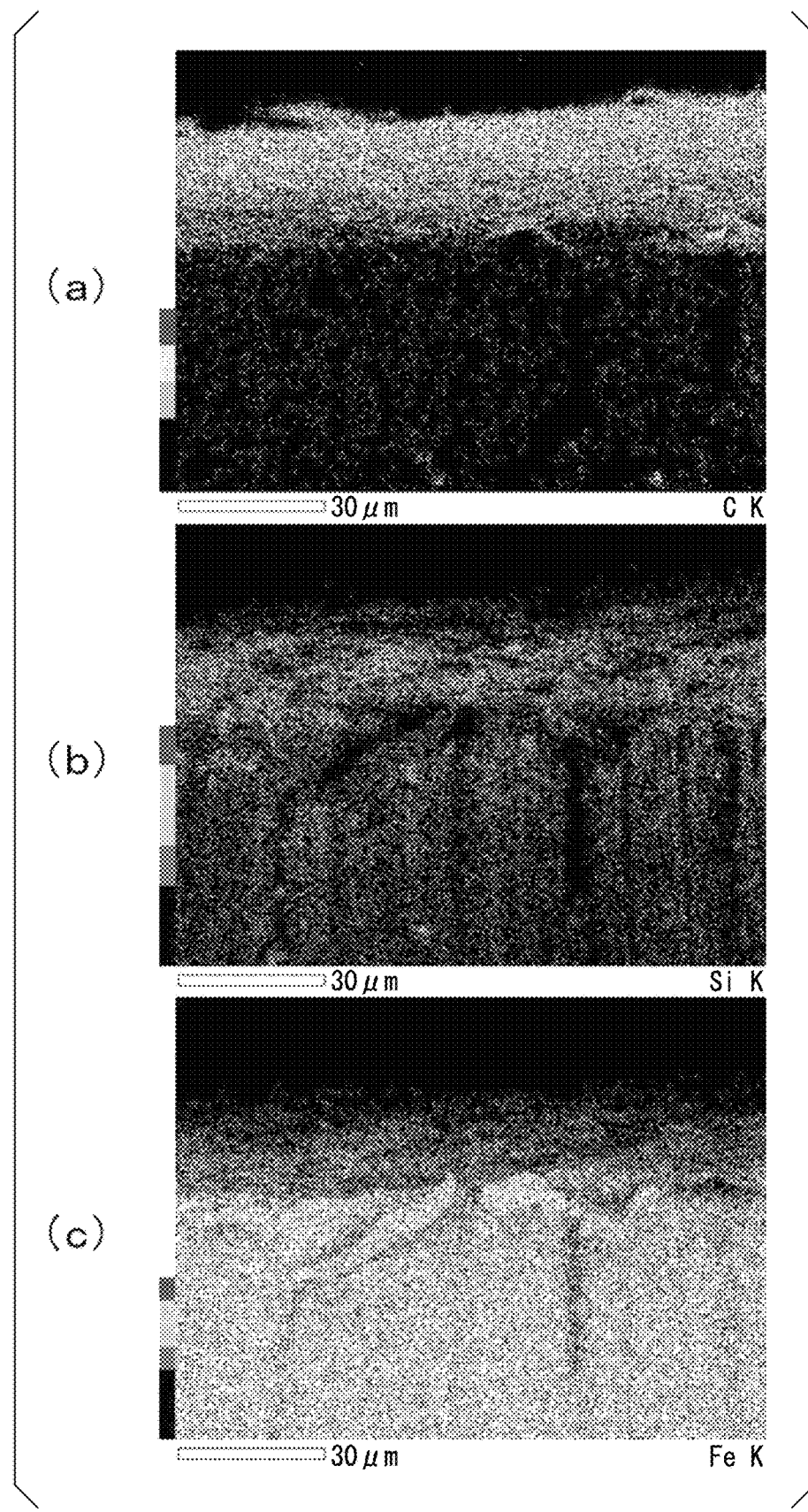
FIG. 18 is a composition distribution image of a cross section of Sample 7.

A cross-sectional SEM photograph of Sample 7 is shown in FIG. 17. As shown in FIG. 17, a carbon layer having a thickness of approximately 15 µm was present on the silicon monoxide layer. This carbon layer was slightly denser than the carbon layer in Sample 6. In addition, the shape of the carbon layer in Sample 7 was similar to the shape of the carbon layer in Sample 6. The composition analysis result of the cross section of Sample 7 is shown in FIG. 18. FIG. 18(a) shows the distribution of carbon (C), FIG. 18(b) shows the distribution of silicon (Si), and FIG. 18(c) shows the distribution of iron (Fe). Each element is present in the lighter-colored part. As shown in FIG. 17 and FIG. 18, some carbon infiltrated the silicon monoxide layer, and carbon that was in direct contact with iron, which was the base plate, was observed.

(Evaluation of Lithium-Ion Secondary Battery for which Sample 7 was Used as Negative Electrode)

Figure 19:
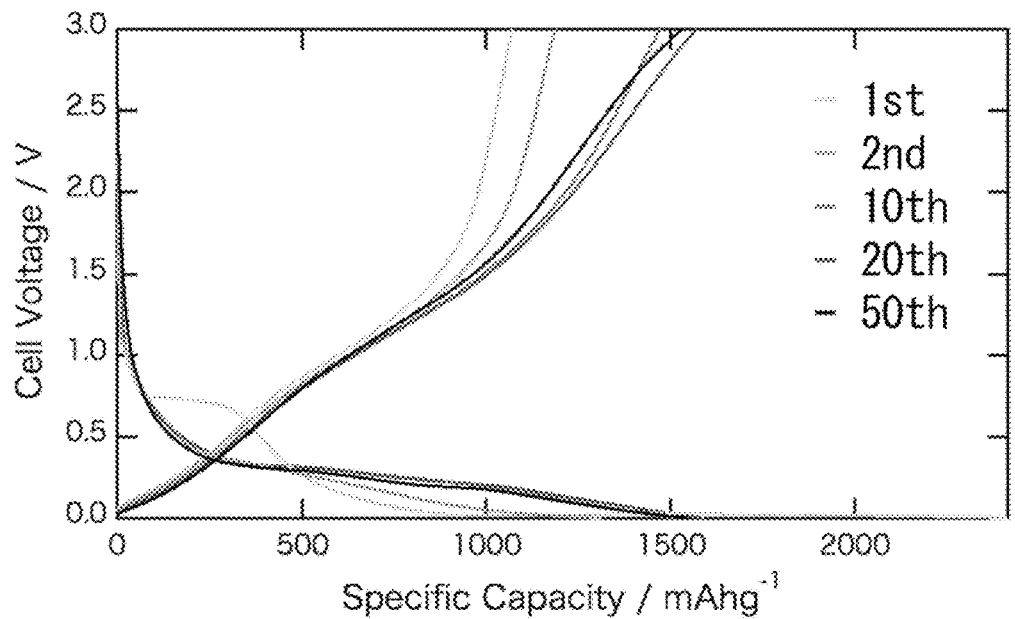
FIG. 19 is a graph of charge and discharge cycles of a lithium-ion secondary battery for which Sample 7 is used as the negative electrode and a table showing charging and discharging capacities in each cycle.

The charge and discharge characteristics of a lithium-ion secondary battery for which Sample 7 was used as the negative electrode were evaluated in the same manner as the evaluation of the lithium-ion secondary battery for which Sample 2 was used as the negative electrode. The results are shown in FIG. 19. As shown in FIG. 19, the initial charging capacity was approximately 20% smaller than the theoretical value. The charging capacity of the lithium-ion secondary battery for which Sample 7 was used as the negative electrode was approximately 30% smaller than the charging capacity of the lithium-ion secondary battery for which Sample 6 was used as the negative electrode even in the second and later cycles.

However, the charging capacity increased until almost the $30^{th}$ cycle and reached 1645.1 mAh/g. After that, deterioration started slightly, and the charging capacity after the $50^{th}$ cycle became 1551.7 mAh/g. No significant difference was observed between the shape of Sample 7 produced using the non-aqueous binder and the shape of Sample 6 produced using the aqueous binder. However, the cycle characteristics of the lithium-ion secondary battery for which Sample 6 was used as the negative electrode were superior to the cycle characteristics of the lithium-ion secondary battery for which Sample 7 was used as the negative electrode.

Non-Patent Literature 1 describes the superiority of an aqueous binder using silicon as an example of an electrode-active material. According to Non-Patent Literature 1, in a lithium-ion secondary battery for which a negative electrode containing an electrode-active material held on a base plate through a hydroxyl group made from an aqueous binder is used, it is possible to flexibly change the binding position between the electrode-active material and the base plate in a charging and discharging process. Therefore, it is possible to maintain the structure of the electrode-active material even when the volume of the electrode-active material expands or contracts in the charging and discharging process. On the other hand, in a case where the electrode-active material is held on the base plate using a non-aqueous binder, it is not possible to change the binding position between the electrode-active material and the base plate in the charging and discharging process. Therefore, stress generated by the expansion and contraction of the volume induces the destruction of the electrode-active material, and the charge and discharge characteristics of the lithium-ion secondary battery degrade.

Even in the multilayer body of the present invention, it is considered that, when a conductive layer is formed on the surface of the layer of silicon monoxide, which is an electrode-active material, a conductive substance infiltrates the silicon monoxide layer, and the conductive substance assists the migration of electric charges in association with the charging and discharging of silicon monoxide. Therefore, it is considered that the superiority of the formation of the silicon layer using an aqueous binder, which is disclosed in Non-Patent Literature 1, be applied to the formation of the conductive layer of the multilayer body of the present invention.

Therefore, the multilayer body of the present invention produced using CMC, which is an aqueous binder, is capable of stably intercalating and de-intercalating lithium compared with the multilayer body of the present invention produced using a non-aqueous binder. As a result, the cycle retention rate of the charging and discharging capacities of a lithium-ion secondary battery for which the multilayer body of the present invention produced using an aqueous binder is used as the negative electrode is superior to the cycle retention rate of the charging and discharging capacities of a lithium-ion secondary battery for which the multilayer body of the present invention produced using a non-aqueous binder is used as the negative electrode.

The invention claimed is:
1. A multilayer body, comprising:
   a conductive substrate; and
   a composite layer that is provided on the conductive substrate and includes a plurality of particles of silicon oxide having an average particle diameter of 0.2 µm or less and a conductive substance present in gaps between the plurality of particles of silicon oxide, and further comprising:
a conductive layer that is provided on the composite layer, contains the conductive substance, does not contain the particles of silicon oxide, and is at least several micrometers thick, and
wherein the composite layer and the conductive layer are planar layers.

2. The multilayer body according to claim 1, wherein the silicon oxide is silicon monoxide.

3. The multilayer body according to claim 1, wherein the plurality of particles of silicon oxide is a mixture of particles of amorphous silicon oxide and particles of silicon.

4. The multilayer body according to claim 1, wherein the silicon oxide is amorphous silicon oxide.

5. The multilayer body according to claim 1, wherein the conductive layer has a thickness of several micrometers or more, and 20 μm or less.

6. A method for producing the multilayer body according to claim 1, comprising:
a film formation step of forming a silicon oxide layer containing a plurality of particles of silicon oxide on a conductive substrate by vapor deposition or sputtering; and
an application step of applying a mixture containing a conductive substance and a binding agent onto the silicon oxide layer, infiltrating the conductive substance into the silicon oxide layer, and forming a conductive layer containing the conductive substance on the silicon oxide layer.

7. A method for producing the multilayer body according to claim 1, comprising:
a film formation step of forming a silicon oxide layer containing a plurality of particles of silicon oxide on a conductive substrate by vapor deposition or sputtering;
an oxidation step of oxidizing the silicon oxide layer to convert the silicon oxide layer into an amorphous silicon oxide layer including amorphous silicon oxide in at least a part of the amorphous silicon oxide layer; and
an application step of applying a mixture containing a conductive substance and a binding agent onto the amorphous silicon oxide layer, infiltrating the conductive substance into the amorphous silicon oxide layer, and forming a conductive layer containing the conductive substance on the amorphous silicon oxide layer.

8. A method for producing the multilayer body according to claim 1, comprising:
a film formation step of forming a silicon oxide layer containing a plurality of particles of silicon oxide on a conductive substrate by vapor deposition or sputtering;
a heating step of heating the silicon oxide layer to convert the silicon oxide layer into a mixed layer including amorphous silicon oxide and silicon; and
an application step of applying a mixture containing a conductive substance and a binding agent onto the mixed layer, infiltrating the conductive substance into the mixed layer, and forming a conductive layer containing the conductive substance on the mixed layer.

9. The method for producing a multilayer body according to claim 6, wherein the silicon oxide is silicon monoxide.

10. A lithium-ion secondary battery, comprising:
a positive electrode;
a negative electrode including the multilayer body according to claim 1; and
an electrolyte.

* * * * *